United States Patent [19]

Liot

[11] Patent Number: 4,524,082

[45] Date of Patent: Jun. 18, 1985

[54] HIGHLY CONCENTRATED EGG WHITE OR SALTED WHOLE EGG PRODUCT AND ITS METHOD OF PREPARATION

[75] Inventor: Roger Liot, Creteil, France

[73] Assignee: Roger Liot, S.A., Creteil, France

[21] Appl. No.: 311,311

[22] Filed: Oct. 14, 1981

[30] Foreign Application Priority Data

Oct. 17, 1980 [FR] France ................. 80 22309

[51] Int. Cl.³ ................................................ A23L 1/32
[52] U.S. Cl. ..................... 426/312; 426/330.1; 426/614; 210/651
[58] Field of Search ............... 426/614, 330.1, 312, 426/318, 319; 210/651

[56] References Cited

U.S. PATENT DOCUMENTS

| | | | |
|---|---|---|---|
| 2,377,644 | 6/1945 | Parsons et al. | 426/614 |
| 3,222,194 | 12/1965 | Gorman et al. | 426/614 |
| 3,640,731 | 2/1972 | Kaplow et al. | 426/614 |

FOREIGN PATENT DOCUMENTS

| | | | |
|---|---|---|---|
| 2276787 | 1/1976 | France . | |
| 314273 | 6/1929 | United Kingdom . | |
| 1330037 | 9/1973 | United Kingdom | 426/614 |

*Primary Examiner*—William Smith
*Attorney, Agent, or Firm*—Wegner & Bretschneider

[57] ABSTRACT

Process for preparing a concentrated egg white or salted whole egg product capable of containing other food ingredients and flavorings and of being preserved protected from the air, according to which the initial egg white is concentrated to a dry solids content of at least 55% compared with the final egg product, in such a manner that at all times and at all points the temperature of the product being processed never exceeds 47° C.; or else the initial whole egg is concentrated to a dry solids content of at least 51% compared with the final egg product, in such a manner that at all times and at all points the temperature of the product being processed never exceeds 60° C., with an amount of between 2 and 4% by weight of added salt compared with the final egg product being added before, during or after concentration. The product obtained can be preserved at least three months at ambient temperature and a further week at 37° C.

After rehydration it is used in making confectionery or for any food preparation in a similar way to that of fresh egg white or whole egg.

9 Claims, No Drawings

HIGHLY CONCENTRATED EGG WHITE OR SALTED WHOLE EGG PRODUCT AND ITS METHOD OF PREPARATION

The present invention relates to a highly concentrated egg white or salted whole egg product, capable of containing food additives and possessing excellent preservation and textural properties, along with its method of preparation.

In French Pat. No. 2,276,787, issued Jan. 30, 1976 the applicant has already described a method of preserving an egg product in which the osmotic pressure is increased to at least 30 atmospheres by concentration, preferably by ultrafiltration, and by the addition of ingredients like salt and sugar in the presence of agents destroying microorganisms so as to achieve a slowing down in the rate of development of the microorganisms originally contained in the product.

But this process requires the application of a biological test monitoring the egg product to be processed. Furthermore this process only involves processing an egg product which has a relatively low concentration and which contains substantial amounts of salt and/or sugar.

The applicant has further described in French patent application No. 77 31 012 a process for preserving a concentrated or unconcentrated egg product in which, firstly the osmotic pressure is raised to 25 atmospheres and secondly the gases dissolved in the original egg product are eliminated down to an oxygen content of less than 3 parts per million. But the process involves monitoring the oxygen content, the prepared products have a pretty low concentration and the proportions of the ingredients introduced are relatively high.

French Pat. No. 679 991, issued Jan. 17, 1930 is also known which describes the preparation of an egg product having a high concentration. But concentration is carried out by evaporation under vacuum in the presence of the ingredients, which leads to the proteins being denatured, and the proportions of the ingredients introduced into the egg product are also high, particularly as far as the salt is concerned.

In addition U.S. Pat. No. 3 640 731 describes a method for preserving an egg product which takes into account the free water content of the prepared product but uses a dry egg product as the starting product.

The applicant has now unexpectedly observed that it is possible to prepare a concentrated egg white or slightly salted whole egg product, capable of containing other food ingredients and flavourings and having excellent preservation and textural properties when, on the one hand the concentration of the final egg product is high enough, and on the other hand the temperature of the product during processing does not exceed a given temperature.

The process of the invention consists either in concentrating the initial egg white down to a dry solids content of at least 55% with respect to the final egg product, in such a way that at each instant, and at any point in the plant, the temperature of the product being processed does not exceed 47° C.; or in concentrating the initial whole egg down to a dry solids content of at least 51% whole egg compared to the final egg product, so that at each instant and at any point in the plant the temperature of the product being processed does not exceed 60° C., with an amount of added salt of between 2 and 4%, and preferably from 3 to 3.6%, by weight compared to the final egg product, being added to the whole egg product, before, during or after its concentration.

In the case of preparation of a concentrated egg white product the concentration is preferably carried out until a dry solids of 55 to 65% is obtained within a temperature range of 43° to 47° C.

Provided strict care is taken not to exceed the temperature of 47° C., it is preferable to use concentration by ultrafiltration in a continuous installation comprising an ultrafilter module and a pump to feed the module with egg product being concentrated, the processed product temperature being monitored continuously, notably at the inlet and the outlet of the ultrafilter module and also in the pump. The processed product temperature is maintained so that it does not exceed 47° C., notably by controlling the throughput of the pump which is mounted with a direct current motor, or by cooling the pump body in a suitable way, for example by circulating cold water.

When a concentrated whole egg product is being prepared the concentration is preferably performed until a dry solids content is obtained of 51 to 62% of whole egg at a temperature not exceeding 60° C., preferably at a temperature of 53° to 60° C.

Preferably use is made either of a method scavenging or sweeping the surface of the processed product by means of an inert gas with agitation being carried out all the while, or of an ultrafiltration process, or again by a combination of both processes.

According to the scavenging process the initial whole egg is placed in a container fitted with an agitation system and a bain marie, or with a jacket with circulation of a heated fluid, in such a way that the temperature does not exceed 60° C. The product being processed is agitated without turbulence and avoiding any foams or crusts being formed, and the product surface is swept by a dry inert gas stream at a temperature not exceeding 60° C.

It is necessary to constantly renew the surface of the egg product which must remain perfectly uniform. The whole egg product is preferably maintained at a temperature approaching that of the inert gas and it is preferably agitated with the liquid moving from bottom to top, so that the processed product is as homogeneous as possible, at the same time as preventing foams and crusts from being formed.

According to a variant, the inert gas loaded with moisture on leaving the reaction vessel is then purged of this moisture, heated to the temperature of the mass of processed product, and sent back to the product surface so that the water is eliminated in closed circuit.

Any evaporation apparatus or plant, notably of thin layer type, operating at the above-mentioned temperatures in the presence of a stream of dry inert gas, may be suitable for carrying out the scavenging concentration process according to the invention.

According to the ultrafiltration process this is carried out in similar conditions to those used for processing the egg white as indicated above. Special care is taken that the processed product temperature does not exceed 60° C., particularly at the inlet and outlet of the ultrafilter module, and in the pump used to feed the above-mentioned module as well.

Finally, the concentration process can be advantageously applied in a first stage of pre-concentration of the whole egg down to a dry solids content of about 45 to 50%, notably by ultrafiltration, and in a second stage of concentration by scavenging and agitation as indicated above.

For the initial egg product hens eggs, generally standard grade eggs collected on a large scale and laid 8 to 30 days before being broken and processed, are used.

The salt used for salting the whole egg, which consists basically of sodium chloride, designates both rock salt and sea salt, and can be introduced at any stage in the process, either directly or in the form of a pre-mix with whole egg.

In the preparation of the concentrated whole egg product, the dry solids content is expressed in whole egg terms, i.e. without taking into account the added salt. Furthermore the added salt is determined in the final product after the amounts of salt already present in the original egg have been subtracted.

The concentrated egg white or whole egg product according to the invention may also contain other food ingredients and flavourings which are added at any time during processing in amounts in the order of 0.1 to 2%, and which may also consist of sugars like saccharose.

When the salt is added at the start of or during ultrafiltration part of the salt is eliminated with the filtrate and, if necessary, the salt content is then adjusted as required in the final concentrated whole egg product, though remaining within the range of the invention.

At the end of the preparation process the concentrated egg white or salted whole egg product, possibly containing other food ingredients and flavourings, is subjected to the usual analyses, notably to a bacteriological analysis to determine its concentration in number of total aerobic germs per gram, which will be subsequently designated by the term "total flora".

Amongst the above-mentioned germs the enterobacteria, the staphylococci and salmonellae are determined in particular.

It is observed that the concentrated egg white or salted whole egg product obtained according to the process of the invention has a total flora of less than 20,000 germs per gram. This product is then stored in an inert gas atmosphere or else packaged in inert gas in metal cans which are subsequently seamed.

Tests carried out after three months storage and after subsequently placing the product for 8 days in a warm room at 37° C. show that not only has the number of germs not increased but that it has considerably fallen.

The inert gas used both for scavenging the whole egg surface and for storage or packaging is a foodstuffs type inert gas like nitrogen, nitrous oxide, a rare gas like argon or a freon like freon 114, i.e. chloro-1-pentafluoro-1,1,2,2,-ethane.

The invention relates to the process for preparing a concentrated egg white or salted whole egg product with the aim of preserving it, as described above.

The invention also relates to a concentrated egg white product having a dry solids content of at least 55%, preferably 55 to 62%, containing less than 20,000 microorganism germs per gram after preservation in an inert atmosphere for three months at ambient temperature and an extra week at 37° C. The above-mentioned product comes in the form of a paste which, after rehydration to about 12% dry solids, has bulking and coagulation properties similar to those of fresh egg white, even after three months storage, which is quite unexpected for an egg product containing no product designed to preserve it. It is especially suited for preparing meringues.

The invention also relates to a concentrated whole egg product having dry solids of at least 51% whole egg, preferably 55 to 62%, an added salt content of between 2 and 4% and preferably of 3 to 3.6% by weight compared to the final egg product, and containing less than 20,000 microorganism germs per gram after preservation in an inert atmosphere for three months at ambient temperature and an extra week at 37° C., which is quite unexpected for a concentrated whole egg product having such a low salt content. The above-mentioned product comes in the form of a paste that is easily dispersed in water and which has a viscosity ranging from 12,000 to 50,000 centipoises. It may contain only salt, but it can also advantageously contain other food ingredients in low quantities, notably flavourings. It is used after rehydration up to about 24% dry solids, in confectionery or for any culinary preparation, notably for the preparation of omelets, in the same way as fresh whole egg, it being understood that one can also choose the level of rehydration desired for certain preparations.

The concentrated egg product of the invention is packaged in seamed metal cans or in tubes, with the latter type of packaging being especially appreciated.

The following examples, which are not limiting, in which standard grade hens eggs collected on a large scale are used, enable the object of the invention to be more clearly understood. Unless otherwise stated the percentages are taken to be always by weight compared with the product involved, temperatures are indicated in degrees centigrade, and the final product dry solids content is given with the added ingredients subtracted.

EXAMPLE 1

Preparation of highly concentrated egg white 110 kg of perfectly mixed egg white, having dry solids of 12.3% and containing 35,000 microorganism germs per gram, is concentrated by ultrafiltration. For this purpose a "UFP 8" ultrafiltration module is used which is manufactured by Rhone Poulenc; it comprises 24 plates supporting type 3,038 acrylonitrile membranes having a cut-off zone of 20,000 and a surface area of 0.1 m2 each, making a total of 2.4 m2.

The ultrafilter module is fed with egg white by means of a positive displacement pump fitted with a "pig tail" piston, installed with a direct current motor; the flow rate of the egg white circulating in closed circuit in the ultrafilter module is 12,000 liters/hour.

The pump body is cooled by water at 5° C. and the maximum temperature of the egg white being processed, checked at the inlet and outlet of the ultrafilter module and also in the pump, did not exceed 46° to 47° C.

After 6 hours concentration a concentrated egg white product is obtained having a dry solids content of 60% and total flora of 6,000 germs/gram, and which is packaged in a nitrogen atmosphere into seamed metal cans.

After three months storage at ambient temperature it is observed that the total flora is 2,000 germs/gram.

Again after three months storage and an extra 8 days staying at 37° C., the total flora is still 2,000 germs/gram.

The concentrated egg white product thus prepared, rehydrated to about 12% dry solids, is especially suited for preparing meringues. It has bulking and coagulation properties which are quite comparable to those of fresh egg white.

EXAMPLE 2

Preparation of a concentrated egg white product.

110 kg of perfectly mixed egg white, having a dry solids content of 11.7% and containing 26,000 germs/gram, is concentrated in the same installation and under the same conditions as in example 1, except that the temperature of the product being processed at any instant and at any point in the installation is controlled so that it does not exceed 43° to 44° C.

After 7 hours concentration a concentrated egg white product is obtained which has a dry solids content of 55% and a total flora of 20,000 germs/gram, and which is packaged in a nitrogen atmosphere in seamed metal cans.

After three months storage at ambient temperature the total flora was 6,000 germs/gram. In a can opened after an extra 8 days at a temperature of 37° C. the total flora was 8,000 germs/gram.

After rehydration to 12% dry solids this product is perfectly suited to making meringues.

EXAMPLE 3

Preparation of a concentrated egg white product.

110 kg of egg white having a dry solids content of 12.1% and containing a total flora of 40,000 germs/gram is concentrated in the same installation and in the same way as in example 1, with the temperature of the product being processed being controlled so that at any instant and at any point it never exceeds 46° to 47° C.

Concentration is carried out for a period of 8 hours 30 minutes and a concentrated egg white product is obtained which has a dry solids content of 65% and a total flora of 15,000 germs/gram; this product is then packaged in a nitrogen atmosphere in metal cans which are sealed by seaming.

After three months storage at ambient temperature the packaged product has a total flora of less than 1,000 germs/gram, as does the product which has been subjected to a further 8 days storage at 37° C.

The product stored as indicated above is rehydrated to about 12% dry solids and is perfectly suited to making meringues.

EXAMPLE 4

Preparation of a concentrated salted whole egg product.

In a first stage 40 kg of whole egg having a dry solids content of 24.5% and a total flora of 35,000 germs/gram is concentrated by ultrafiltration, under the conditions of example 1 at a temperature which does not exceed 55° C., until a pre-concentrated whole egg product is obtained which has a dry solids content of 47%.

2 kg of the pre-concentrated egg product is placed in an open recipient surrounded by a bain marie maintained at a temperature of 55° C., and 52 g of salt is introduced, stirring all the while.

The surface of the egg product, which is agitated without turbulence to prevent foams and crusts forming, is swept with a stream of dry nitrogen at a temperature not exceeding 55° C. The agitation and gas scavenging are carried out under the conditions indicated above for a period of time of 3 hours.

After degassing in a vacuum of 40 mm of mercury, a concentrated whole egg product is obtained which has a dry solids content of 60% whole egg, an added salt content of 3%, a free water content $a_w$ of 0.90, and a total flora, after being held for 15 hours at 55° C. in a nitrogen atmosphere, of less than 1,000 germs/gram. The enterobacteria germ content is less than 10, the staphylococcus content is less than 100 and there are no salmonellae in a 25 gram sample.

The product preserved for three months in a nitrogen atmosphere still has a total flora of less than 1,000 germs/g.

The product comes in the form of an only slightly viscous paste which can easily be dispersed in water and which, after rehydration to about 24% dry solids, can be used directly in confectionery or for culinary preparations, particularly in making omelets, in a manner that is comparable in all points with that using fresh whole eggs.

A salted whole egg product can be obtained according to the invention containing 2% salt, by operating as set out above, but using 2 kg of whole egg concentrated by ultrafiltration having a dry solids content of 55%, placed in a recipient surrounded with a bain marie at a temperature of 55° C. and by introducing 41 g of salt into the concentrated egg, agitating all the while until a homogeneous mixture is obtained, which is packed straight away.

The whole egg product thus obtained has a similar bacteriological analysis to that of the whole egg product containing 3% salt and excellent preservation in spite of its low salt content.

EXAMPLE 5

Preparation of a concentrated whole egg product by concentration and heating with evaporation.

As in example 4, 40 kg of whole egg having a dry solids content of 25% and a total flora of 42,000 germs/gram is concentrated until a pre-concentrated whole egg product is obtained which has a dry solids content of 47%.

2 kg of the pre-concentrated whole egg product is treated by agitation and scavenging as in example 4 at a temperature of 55° C., with the amount of added salt being 70 g.

After a time span of 4 hours a concentrated whole egg product is obtained which has dry solids of 61.9% whole egg, an added salt content of 3.9%, a free water content $a_w$ of 0.90 and a total flora of less than 1,000 germs/gram and contains neither enterobacteria nor staphylococci.

After storage for three months in a nitrogen atmosphere the total flora is still less than 1,000 germs/gram.

The product obtained in the form of a paste is perfectly suited to making omelets.

EXAMPLE 6

Preparation of a concentrated whole egg product, by ultrafiltration.

22.250 kg of whole egg having a dry solids content of 24% and a total flora of 40,000 germs/gram is concentrated by ultrafiltration, with the temperature of the processed product not exceeding 59° C. at any instant and at any point in the installation, using the "UFP 8" ultrafiltration module of example 1 but comprising 6 plates measuring 0.1 m2 each. The module is fed by an S 4 type pump manufactured by the MOUVEX company, having a maximum throughput of 4,000 liters/hour at 700 revs/min, and working at half speed.

After 6 hours of ultrafiltration 1.0 kg of salt is gradually introduced into the circulating mixture and ultrafiltration is continued for a total time of 12 hours.

A concentrated whole egg product is thus obtained which has a dry solids content of 57.7% whole egg, an added salt content of 3.9% and which comes in the form of a paste with which glass jars, metal cans subsequently sealed by seaming and tubes are filled in a nitrogen atmosphere and placed in a hot room at 54° C.

After a time span of 20 hours in the hot room it is observed that the product contained in the jars, the cans and the tubes has a total flora of less than 2500 germs/gram, there being no salmonellae.

After three months storage at ambient temperature the total flora is less than 3,000 germs/gram whatever the type of packaging.

The product obtained is perfectly suited to making omelets.

The temperature of the processed product at the inlet and outlet of the ultrafilter module, and also of the pump body of the module input pump, was controlled throughout and never exceeded 59° C.

EXAMPLE 7

Preparation of a concentrated whole egg product, by ultrafiltration.

17 kg of whole egg with a dry solids content of 24.7% and a total bacterial flora of 35,000 germs/gram is concentrated as in example 6; the temperature of the processed product never exceeds 55° to 56° C. at any time and at any point in the installation.

After 5 hours concentration an amount of 8 kg of whole egg having the same characteristics as those indicated above and containing 10% salt by weight is introduced into the concentration circuit.

After 11 hours ultrafiltration, during which the pressure at the module inlet was about 5 kg, a concentrated whole egg product is obtained which has a dry solids content of 51% whole egg, an added salt content of 3.6% and a total flora of 15,000 germs/gram.

After a stay of 14 hours in the hot room at a temperature of 55° C. and in a nitrogen atmosphere, the total flora is less than 1,000 germs/gram.

By operating in accordance with examples 6 and 7 it is also possible to introduce a flavour before, during or after ultrafiltration, to obtain a concentrated whole egg product possessing outstanding culinary properties, In each of examples 4 to 7 the added sodium chloride content is calculated differentially by subtracting the sodium chloride contained in the initial fresh egg from the total sodium chloride content.

In examples 4 to 7, the temperature of the product being processed was monitored continuously, notably at the inlet and outlet of the ultrafilter module, and also in the positive displacement pump feeding the above-mentioned module, the throughput being adjusted along with the pump cooling system to obtain an indicated temperature not exceeding 60° C.

I claim:

1. A process for preparing a concentrated whole egg product in the form of a paste which can be stored at ambient temperature in an air excluded environment and can then be reconstituted by rehydration for use in any culinary preparation in the same way as fresh whole egg, comprising
concentrating liquid whole egg to a paste having a dry solids content of 55 to 62% without permitting the temperature of the product to exceed 60° C., said concentrating step comprising
scavenging the product surface by means of a dry inert gas at a temperature not exceeding 60° C., the product being moved or agitated without turbulence substantially preventing the formation of foams and crusts;
and adding between 2 and 4% salt by weight based on the concentrated egg product; whereby said paste maintains its preservation and the textural properties of said liquid whole egg during storage at ambient temperature for at least three months in an air free atmosphere.

2. A process of claim 1, wherein the egg product used as the starting material is uncooked.

3. A process for preparing a concentrated whole egg product in the form of a paste which can be stored at ambient temperature in an air excluded environment and can then be reconstituted by rehydration for use in any culinary preparation in the same way as fresh whole egg, consisting essentially of:
concentrating by ultrafiltration liquid whole egg to a paste having a dry solids content of 55 to 62% while controlling the temperature of the product to be maintained between 53 and 60° C.; and
adding between 2 and 4% salt by weight based on the concentrated egg product; whereby said paste contains less than 20,000 microorganism germs per gram and maintains its preservation and the textural properties of said liquid whole egg during storage at ambient temperature for at least three months in an air free atmosphere.

4. A process according to claim 3 in which said salt is added after said concentration.

5. A process for preparing a concentrated whole egg product in the form of a paste which can be stored at ambient temperature in an air excluded environment and can then be reconstituted by rehydration for use in any culinary preparation in the same way as fresh whole egg, comprising:
concentrating by ultrafiltration liquid whole egg without any additive or preservative to a paste having a dry solids content of 45 to 50% while controlling the temperature of the product to be maintained between 53° and 60° C.;
thereafter further concentrating said product by scavenging the product surface by means of a dry inert gas at a temperature not exceeding 60° C., the product being moved or agitated without turbulence, substantially, preventing the formation of foams and crusts; and
adding to said product during said further concentration step between 2 and 4% salt by weight based on the final concentrated egg product; whereby said paste maintains its preservation and the textural properties of said liquid whole egg during storage at ambient temperature for at least three months in an air free atmosphere.

6. A concentrated whole egg paste product capable of being stored at ambient temperature in an air excluded environment which can then be reconstituted by rehydration for use in any culinary preparation in the same way as fresh whole egg, essentially consisting of:
dry whole egg solids content of from 55 to 62% which has been obtained by concentrating liquid whole egg without permitting the temperature of the product to exceed 60° C.;

salt by weight between 2 and 4%;

additional food ingredients or flavoring agents in amounts of 0.1 to 2%; and containing less than 20,000 microorganism germs per gram after storage in an inert atmosphere for three months at ambient temperature and for a further week at 37° C. said paste product having substantially the same textural properties as said liquid whole egg.

7. A process for preparing a concentrated egg white product in the form of a paste which can be stored at ambient temperature in an air excluded environment and can then be reconstituted by rehydration for use in any culinary preparation in the same way as fresh egg white, consisting essentially of:

concentrating by ultrafiltration liquid egg white to a paste having a dry solids content of 55 to 65% while controlling the temperature of the product to be maintained between 43° and 47° C.;

whereby said paste contains less than 20,000 microorganism germs per gram and maintains its preservation and the textural properties of said liquid whole egg during storage at ambient temperature for at least three months in an air free atmosphere and has textural properties, bulking and coagulation properties substantially identical to those of said liquid egg white.

8. A process according to claim 7 wherein said concentrating step is made by using an ultrafiltration module comprising a plurality of membranes fed with egg white by means of a positive displacement pump fitted with a pig tail piston means, the temperature of the pump body and of said egg white being permanently monitored in order that said egg white product is maintained between 43° and 47° C.

9. A concentrated egg white paste product capable of being stored at ambient temperature in an air excluded environment and which can be reconstituted by rehydration for use in any culinary preparation in the same way as fresh white egg, consisting essentially of a dry egg white solids content of from 55 to 65% which has been obtained by concentrating liquid egg white while maintaining the temperature of the product between 43° and 47° C. and containing less than 20,000 microorganism germs per gram after storage in an inert atmosphere for three months at ambient temperature and for a further week at 37° C.; said paste product having substantially the same textural bulking and coagulation properties as said liquid egg white.

* * * * *